US012730516B2

(12) United States Patent
Ye et al.

(10) Patent No.: US 12,730,516 B2
(45) Date of Patent: Sep. 8, 2026

(54) TOUCH DEVICE

(71) Applicant: TPK Advanced Solutions Inc., Xiamen (CN)

(72) Inventors: Cai-Jin Ye, Xiamen City (CN); Tsai-Kuei Wei, Hsinchu County (TW); Wei-Yi Lin, Taoyuan City (TW); Chen-Hsin Chang, Taoyuan City (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 18/917,187

(22) Filed: Oct. 16, 2024

(65) Prior Publication Data

US 2025/0181168 A1 Jun. 5, 2025

(30) Foreign Application Priority Data

Dec. 5, 2023 (CN) ........................ 202311657420.2

(51) Int. Cl.
*G06F 3/01* (2006.01)
*G06F 3/044* (2006.01)

(52) U.S. Cl.
CPC ............ *G06F 3/016* (2013.01); *G06F 3/0443* (2019.05); *G06F 2203/04105* (2013.01)

(58) Field of Classification Search
CPC ................... G06F 3/016; G06F 3/0443; G06F 2203/04105; G06F 3/04144; G06F 3/0412
See application file for complete search history.

(56) References Cited

U.S. PATENT DOCUMENTS

| | | | | |
|---|---|---|---|---|
| 7,417,422 | B2 * | 8/2008 | Kang | H01H 25/041 324/207.2 |
| 2013/0016484 | A1 * | 1/2013 | Yoo | H04B 1/3833 361/752 |
| 2014/0176478 | A1 * | 6/2014 | Kern | G06F 3/0488 345/173 |
| 2018/0160083 | A1 * | 6/2018 | Mikawa | H04N 9/3144 |
| 2019/0079583 | A1 | 3/2019 | Alghooneh et al. | |
| 2019/0369759 | A1 * | 12/2019 | Costante | H05K 7/142 |
| 2020/0103968 | A1 * | 4/2020 | Amin-Shahidi | G06F 3/016 |
| 2021/0081049 | A1 * | 3/2021 | Rosenberg | G06F 3/047 |
| 2023/0142704 | A1 * | 5/2023 | Feng | G01L 1/26 345/173 |
| 2023/0333656 | A1 * | 10/2023 | Liu | G01L 1/122 |

FOREIGN PATENT DOCUMENTS

| | | | |
|---|---|---|---|
| CN | 103970338 | A | 8/2014 |
| CN | 113922621 | A | 1/2022 |
| TW | 202228443 | A | 7/2022 |
| TW | I773594 | | 8/2022 |

* cited by examiner

*Primary Examiner* — Md Saiful A Siddiqui
(74) *Attorney, Agent, or Firm* — Cooper Legal Group, LLC

(57) ABSTRACT

A touch device comprises a circuit board assembly and a magnet set. The circuit board assembly comprises a first circuit board, a second circuit board, and a plurality of supporting units. A touch electrode layer is disposed on the first circuit board. A coil set is disposed on the second circuit board. The supporting units serve as support between the first circuit board and the second circuit board. The magnet set is disposed on the first circuit board and is disposed corresponding to the coil set.

14 Claims, 5 Drawing Sheets

TOUCH DEVICE

CROSS-REFERENCE TO RELATED APPLICATION

The instant application claims priority to China Patent Application 202311657420.2, filed Dec. 5, 2023, which is incorporated herein by reference.

FIELD OF DISCLOSURE

The present disclosure relates to a touch device.

DESCRIPTION OF RELATED ART

The current trend of development of touch devices advances from merely a touch function to an integration of touch, force sensing, and haptic feedback. A touch device of the prior art installs a force sensor on an elastic component (such as a metal frame) and mounts the elastic component to a touch circuit board, for example, such as described in Taiwan Patent Application No. 1773594. However, designs of the touch devices of the prior art will encounter a deformation problem at the center part of a cover plate in applications of computers with larger dimension.

Therefore, it is apparent and inevitable that the industry needs solutions to the aforementioned problems of touch devices and should invest in its research and development resources.

SUMMARY OF THE DISCLOSURE

In view of this, one objective of the present disclosure is to provide solutions of the aforementioned problems of touch devices.

In order to achieve the aforementioned objective, based on one embodiment of the present disclosure, a touch device comprising a circuit board assembly and a magnet set is disclosed. The circuit board assembly comprises a first circuit board, a second circuit board, and a plurality of supporting units. The first circuit board has a touch electrode layer disposed thereon. The second circuit board has coil sets disposed thereon. The supporting units provide support between the first circuit board and the second circuit board. The magnet set is disposed on the first circuit board and is disposed corresponding to the coil set.

In one or several embodiments of the present disclosure, the magnet set is disposed on a side of the first circuit board facing the second circuit board. The coil set is disposed on a side of the second circuit board facing the first circuit board.

In one or several embodiments of the present disclosure, the second circuit board comprises a plurality of elastic arms. The plurality of supporting units are disposed on the plurality of elastic arms individually.

In one or several embodiments of the present disclosure, the second circuit board has a plurality of through grooves. The plurality of through grooves are adjacent to edges of the plurality of elastic arms individually.

In one or several embodiments of the present disclosure, the plurality of through grooves are U-shaped grooves.

In one or several embodiments of the present disclosure, the touch device further comprises a plurality of force sensors. The plurality of force sensors are disposed on the side of the second circuit board facing the first circuit board.

In one or several embodiments of the present disclosure, the second circuit board comprises a plurality of elastic arms. The plurality of force sensors are disposed on the plurality of elastic arms individually.

In one or several embodiments of the present disclosure, the touch device further comprises a casing and a connecting member. The casing is located below the second circuit board. The connecting member is connected between the casing and the second circuit board. The connecting member has a plurality of concavities.

In one or several embodiments of the present disclosure, the touch device further comprises a plurality of force sensors. The second circuit board comprises a plurality of elastic arms. The plurality of force sensors are disposed on the plurality of elastic arms individually. The plurality of concavities are disposed under and corresponding to the plurality of force sensors.

In one or several embodiments of the present disclosure, the connecting member has two sides that are opposite to each other, and the plurality of concavities are on at least one side of the two sides of the connecting member.

In one or several embodiments of the present disclosure, the touch device further comprises a casing and a connecting member. The casing is located under the second circuit board. The connecting member is connected between the casing and the second circuit board. The casing is faces a surface of the connecting member and has a plurality of grooves.

In one or several embodiments of the present disclosure, the touch device further comprises a plurality of force sensors. The second circuit board comprises a plurality of elastic arms. The plurality of force sensors are disposed on the plurality of elastic arms individually. The plurality of grooves are disposed under and corresponding to the plurality of force sensors.

In summary, according to the touch device of the present disclosure, the circuit board assembly is installed with a plurality of supporting units internally to reinforce the overall support of the circuit board assembly. The magnet set disposed on the circuit board assembly can further enhance the overall stiffness of the circuit board assembly. Hereby, the touch device of the present disclosure can effectively resolve the deformation problem of the center part of the cover plate in the applications of computers with larger dimension.

The aforementioned descriptions are for explaining the problems to be solved, the technological ways for solving the problems, and the effect to be achieved by the present disclosure. Detailed descriptions of the present disclosure are provided as follows, accompanied by referred embodiments with reference to relevant drawings.

BRIEF DESCRIPTION OF THE DRAWINGS

To better understand the aforementioned and other objectives, novel features, advantages, and embodiments of the present disclosure, diagrams are provided as follows.

DETAILED DESCRIPTION OF PREFERRED EMBODIMENTS

Figure 1:
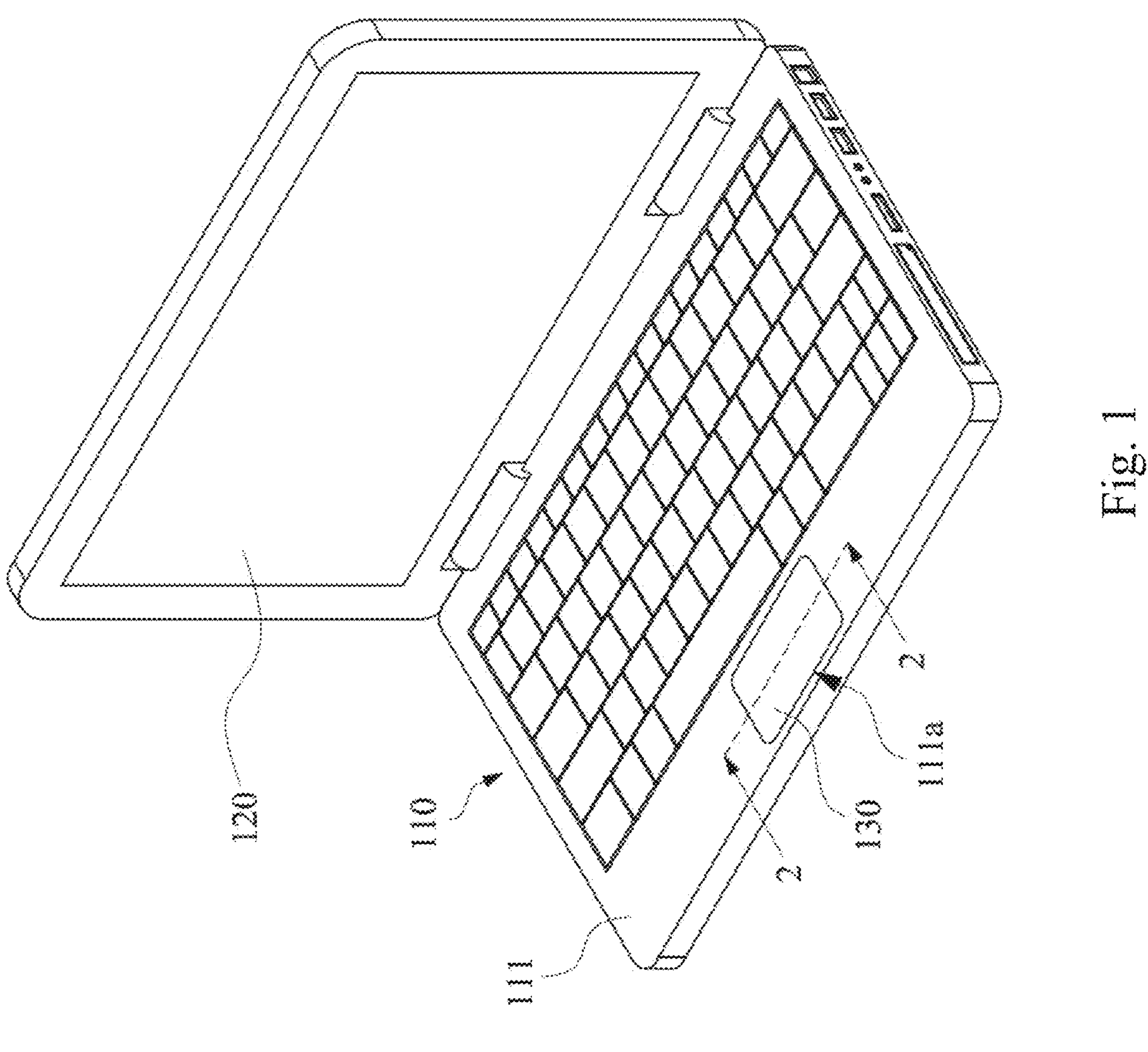
FIG. 1 is a schematic diagram of an embodiment of the touch device of the present disclosure.

A plurality of embodiments of the present disclosure will be disclosed below with reference to drawings. For the purpose of clear illustration, many details in practice will be described together with the following descriptions. However, these detailed descriptions in practice are for illustration only, and should not be interpreted to limit the scope, applicability, or configuration of the present disclosure in any way. That is, in some embodiments of the present disclosure, these details in practice are not necessarily required. Furthermore, for the purpose of simplifying drawings, some structures and components of the prior art shown in the drawings will be illustrated schematically.

Please refer to FIG. 1, which is a schematic diagram of an embodiment of the touch device 100 of the present disclosure. In the embodiment illustrated in FIG. 1, the touch device comprises a host computer 110, a display 120, and a touchpad module. The touchpad module is disposed in an accommodating groove 111*a* of a casing 111 of the host computer 110. The touch device 100 is illustrated as a component of a laptop computer. However, the present disclosure is not limited thereto. In practical implementations, the touch device 100 can also be an electronic device (for example, personal digital assistant, keyboard of a touchpad, etc.) using the touchpad as an input method or operational interface. In other words, the concept of the touch device 100 of the present disclosure is applicable to any electronic device that uses a touchpad as an input method or operational interface. Detailed descriptions of the structures and functions of some elements of the touch device 100, and the connections and associated operations among these elements, are provided in the following paragraphs.

Figure 2:
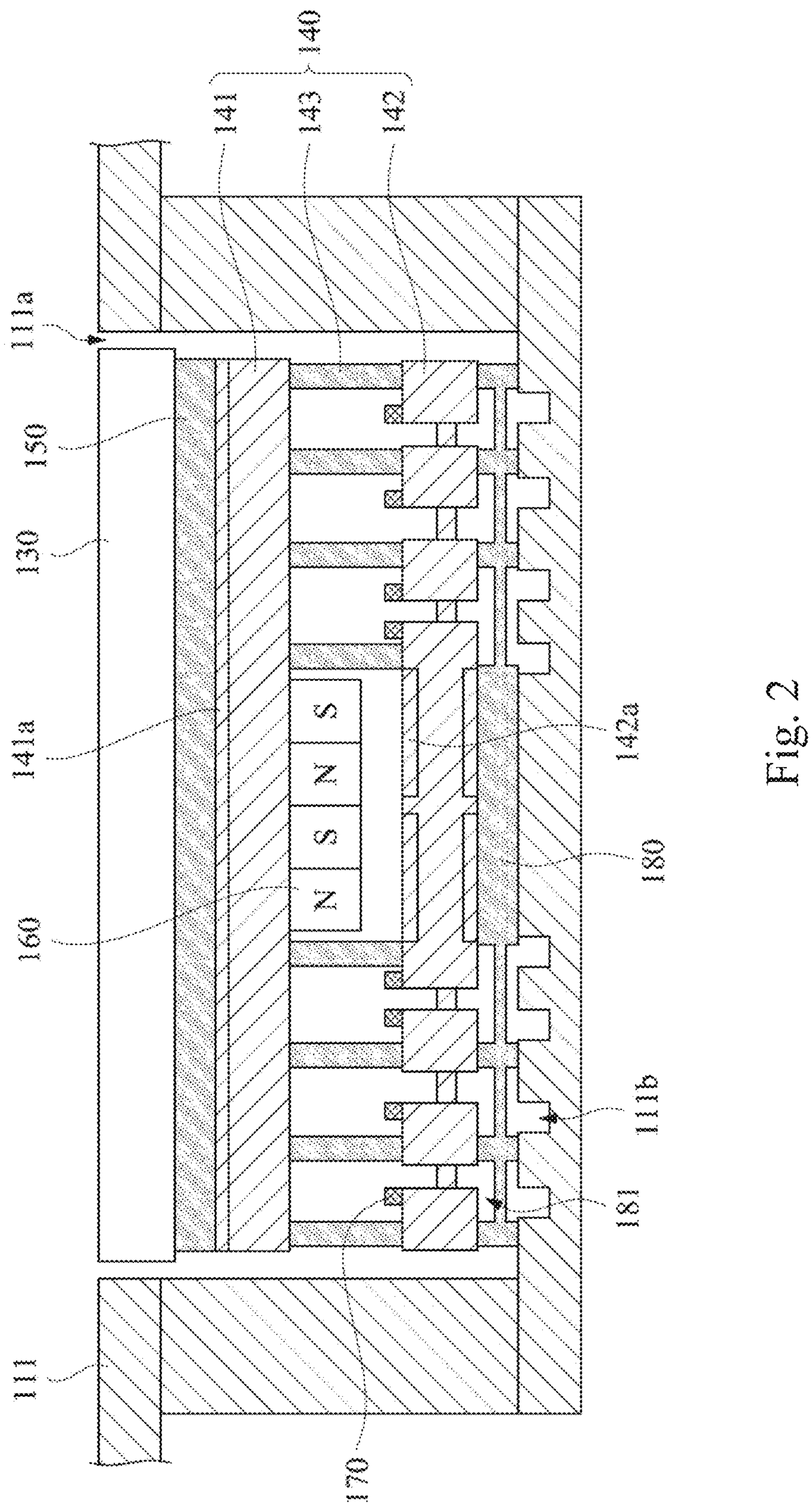
FIG. 2 is a partial cross-sectional schematic view of the touch device described in FIG. 1 along the 2-2 cutting plane line.

Please refer to FIG. 2, which is a partial cross-sectional schematic view of the touch device 100 described in FIG. 1 along the 2-2 cutting plane line. In the embodiment illustrated in FIG. 2, the touch device 100 further comprises a cover plate 130, a circuit board assembly 140, and a magnet set 160. The cover plate 130, the circuit board assembly 140, and the magnet set 160 are disposed in the accommodating groove 111*a* of the casing 111. The cover plate 130 is exposed to the outside at the opening of the accommodating groove 111*a*. The circuit board assembly 140 is disposed under the cover plate 130 and connected with the cover plate 130 through the adhesive layer 150. The circuit board assembly 140 sits on the base of the accommodating groove 111*a* and is connected with the casing 111 through a connecting member 180. The circuit board assembly 140 comprises a first circuit board 141, a second circuit board 142, and a plurality of supporting units 143. The first circuit board 141 has a touch electrode layer 141*a* disposed thereon. The second circuit board 142 has a coil set 142*a* disposed thereon. The supporting units 143 provide support between the first circuit board 141 and the second circuit board 142. The magnet set 160 is disposed on the first circuit board 141 and is disposed corresponding to the coil set 142*a*.

Through the aforementioned structural configuration, the circuit board assembly 140 (the space between the first circuit board 141 and the second circuit board 142) is installed with a plurality of supporting units 143 internally to reinforce the overall support of the circuit board assembly 140. In addition, the magnet set 160 disposed on the first circuit board 141 of the circuit board assembly 140 can further enhance the overall stiffness of the circuit board assembly 140. Thus, the touch device 100 of the present disclosure can effectively resolve the deformation problem of the center part of the cover plate 130 in larger dimension applications.

In several embodiments, the touch electrode layer 141*a* is configured to detect the touch of a user and operations of the user on the surface of the cover plate 130 through a finger, stylus, or other touch tools, and generates touch input signals correspondingly.

In the embodiment illustrated in FIG. 2, the magnet set 160 is disposed on the side of the first circuit board 141 facing the second circuit board 142. The coil set 142*a* is disposed on the side of the second circuit board 142 facing the first circuit board 141. The magnet set 160, disposed on the first circuit board 141, and the coil set 142*a*, disposed on the second circuit board 142, constitute a vibration module. The vibration module is configured to generate an appropriate vibration acceleration to meet the expectations of the user with respect to an interactive experience.

Figure 3:
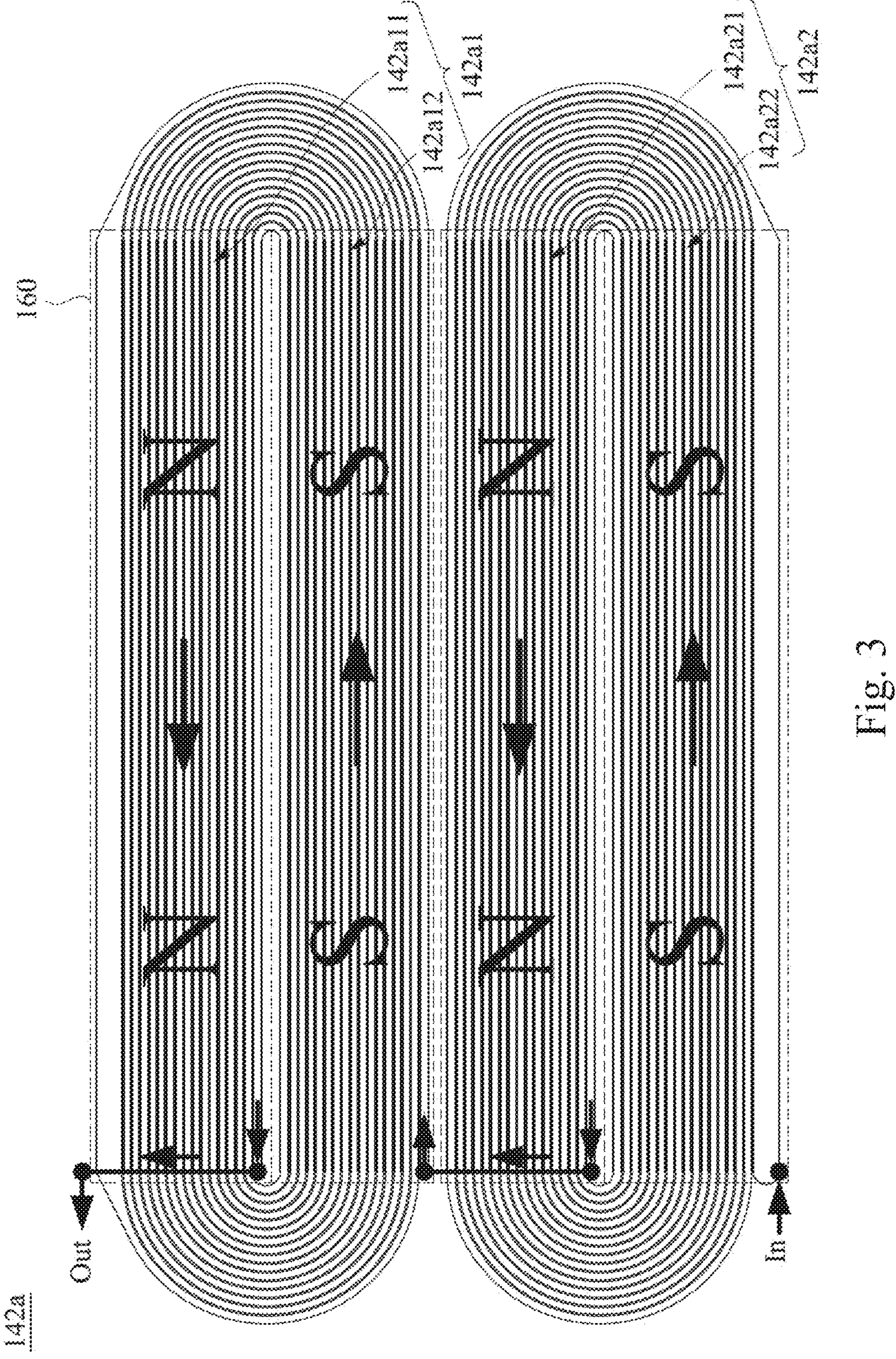
FIG. 3 is a top view of the coil set and the magnet set described in FIG. 2.

Please refer to FIG. 3, which is a top view of the coil set 142*a* and the magnet set 160 described in FIG. 2. In the embodiment illustrated in FIG. 3, the coil set 142*a* comprises two coil units 142*a*1, 142*a*2. These two coil units 142*a*1, 142*a*2 are electrically connected to each other. More specifically, coil units 142*a*1, 142*a*2 are produced by the same coil winding method and are connected in series. The coil unit 142*a*1 comprises two straight coil bundle sections 142*a*11, 142*a*12. These two straight coil bundle sections 142*a*11, 142*a*12 are aligned horizontally and stacked vertically side by side. The polarity of the magnet set 160 corresponding to the straight coil bundle sections 142*a*11, 142*a*21 is a N pole; the polarity of the magnet set 160 corresponding to the straight coil bundle sections 142*a*12, 142*a*22 is a S pole. For example, when the direction of current of coil units 142*a*1, 142*a*2 (the direction of the thick arrow shown in FIG. 3) is counterclockwise, the directions of the force on the straight coil bundle sections 142*a*11, 142*a*12, 142*a*21, 142*a*22 are all upward according to the left-hand rule (that is, the palm pointing in the direction of the N pole; four fingers pointing in the direction of the electric current; then, the thumb pointing in the direction of force on the conductor). On the other hand, when the direction of current of coil units 142*a*1, 142*a*2 is clockwise, the directions of the force on the straight coil bundle sections 142*a*11, 142*a*12, 142*a*21, 142*a*22 are all downward.

Figure 4:
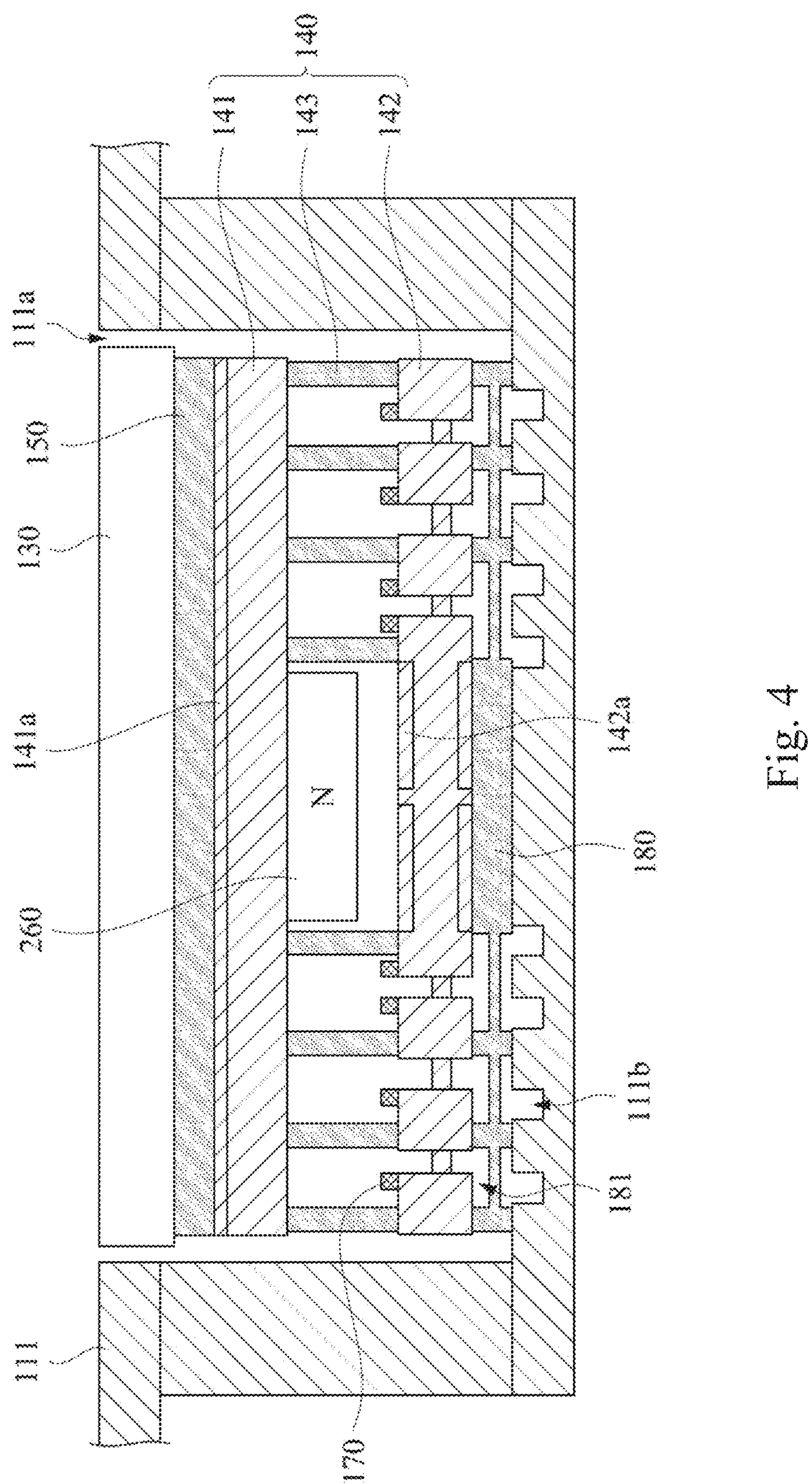
FIG. 4 is a partial cross-sectional schematic view of another embodiment of the touch device of the present disclosure.

Therefore, the vibration module, constituted by the magnet set 160 and the coil set 142*a* shown in FIG. 2, can have movement in the form of a horizontal linear motor. However, the present disclosure is not limited thereto. Please refer to FIG. 4, which is a partial cross-sectional schematic view of another embodiment of the touch device 200 of the present disclosure. As illustrated in FIG. 4, the difference between the embodiment in FIG. 4 and the embodiment shown in FIG. 2 is that the magnet set 260 in FIG. 4 has been modified. More specifically, by changing the magnetic pole direction of the magnet set 260, the vibration module, constituted by the magnet set 160 and the coil set 142*a*, can have movement in the form of a vertical linear motor.

In several embodiments, the coil set 142*a* is an embedded coil set layer that is located on the upper surface of the second circuit board 142 and exposed to the surrounding gap space. However, the present disclosure is not limited thereto.

In several embodiments, the adhesive layer 150 is, but is not limited to, a pressure sensitive adhesive (PSA) layer.

In several embodiments, the connecting member 180 is, but is not limited to, a pressure sensitive adhesive layer.

In several embodiments, the supporting unit 143 has the effect of reducing vibration noise and effectively releasing the vibration stress in the horizontal direction. In several embodiments, in order to achieve the aforementioned effect, the Young's modulus of the supporting units 143 range, but is not limited to, from 0.55 MPa to 0.8 MPa.

Figure 5:
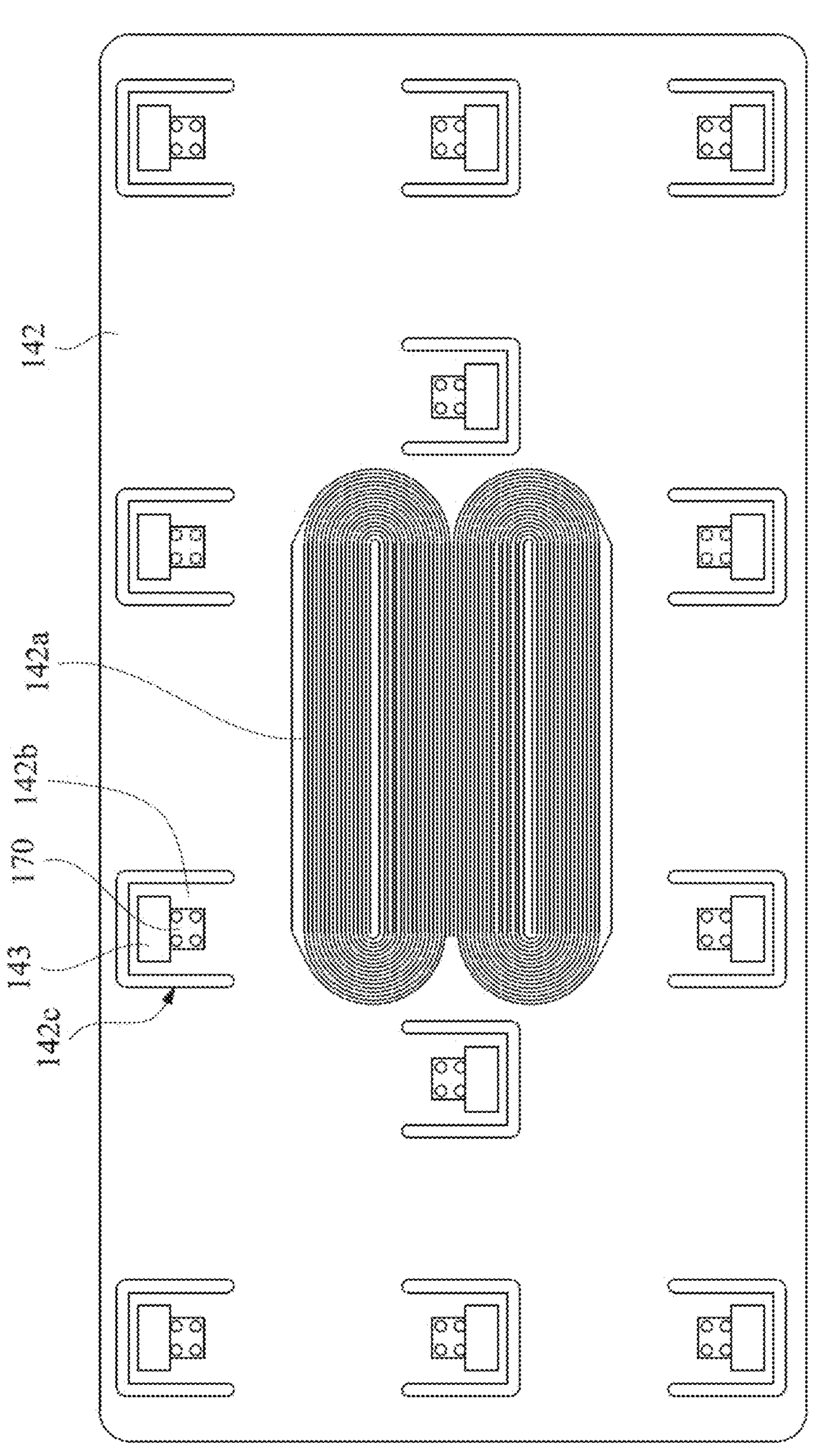
FIG. 5 is a bottom view of the second circuit board and the supporting units described in FIG. 2.

Please refer to FIG. 5, which is a bottom view of the second circuit board 142 and the supporting units 143 described in FIG. 2. In the embodiment shown in FIG. 5, the second circuit board 142 comprises a plurality of elastic arms 142*b*. The supporting units 143 are disposed on the elastic arms 142*b* individually. More specifically, the second circuit board 142 has a plurality of through grooves 142*c*. The through grooves 142*c* perforate the second circuit board 142 and are adjacent to the edges of the elastic arms 142*b* individually. By disposing the supporting units 143 individually on the elastic arms 142*b* of the second circuit board 142, the elastic arms 142*b* can provide a better effect of absorbing vibration or isolating vibration.

In several embodiments, the through grooves 142*c* are U-shaped grooves. The elastic arms 142*b* and the through grooves 142*c* are located within the outer edge of the second circuit board 142. Therefore, the second circuit board 142 can maintain the completeness of the outer edge. As a result, the scale of deformation of portions of the second circuit board 142, except the elastic arms 142*b*, can be kept well under control.

In the embodiment illustrated in FIG. 2, the touch device 100 further comprises a plurality of force sensors 170. The force sensors 170 are disposed on the side of the second circuit board 142 facing the first circuit board 141. The force sensors 170 disposed on the second circuit board 142 are configured to respond to the deformation (for example, deformation created when the user presses the cover plate 130) of the circuit board assembly 140 and to generate force sensing signals. In practical implementations, when the force sensors 170 generate force sensing signals, the circuit board assembly 140 can control the vibration module, based on the signals sent by the force sensors 170, to produce different scales of vibration force, in order to create a haptic feedback effect.

In several embodiments, the force sensors 170 are, but are not limited to, a strain gauge.

In the embodiments shown in FIG. 2 and FIG. 5, the force sensors 170 are disposed in the elastic arms 142*b* individually. Due to the fact that the elastic arms 142*b* are easily deformed, the force sensors 170 disposed on the elastic arms 142*b* individually can effectively increase the detection sensitivity.

In the embodiment shown in FIG. 2, the connecting member 180 connected between the casing 111 and the second circuit board 142 has a plurality of concavities 181. Furthermore, the concavities 181 are disposed under and corresponding to the force sensors 170. The concavities 181 under the force sensors 170 provide an accommodating space that gives the circuit board assembly 140 a space for downward deformation (especially a space for the elastic arm 142*b* under downward deformation).

In the embodiment shown in FIG. 2, the connecting member 180 has two sides that are opposite to each other. The concavities 181 are, but are not limited to, being located on both sides of the connecting member 180. In practical implementations, the concavities 181 can be on at least one side of these two sides.

In the embodiment shown in FIG. 2, the casing 111 facing the surface of the connecting member 180 has a plurality of grooves 111*b*. In addition, the grooves 111*b* are disposed under and corresponding to the force sensors 170. The grooves 111*b* under the force sensors 170 provide an accommodating space that gives the circuit board assembly 140 a space for downward deformation (especially a space for the elastic arm 142*b* under downward deformation).

In view of the aforementioned descriptions of embodiments of the present disclosure, it is apparent that the touch device of the present disclosure has a plurality of supporting units disposed in the circuit board assembly internally that can reinforce the overall support of the circuit board assembly. In addition, the magnet set disposed on the circuit board assembly can further enhance the overall stiffness of the circuit board assembly. Thus, the touch device of the present disclosure can effectively resolve the deformation problem of the center part of the cover plate in the applications of computers with larger dimension.

The aforementioned embodiments are chosen to describe the present disclosure, which is not intended to limit the scope of the present disclosure in any way. Alternative embodiments will become apparent to those skilled in the art to which the present disclosure pertains without departing from its spirit and scope. The scope of the present disclosure is defined by the appended claims rather than the foregoing descriptions and the exemplary embodiments described therein.

COMPONENT SYMBOL

100, 200: touch device
110: host computer
111: casing
111*a*: accommodating groove
111*b*: groove
120: display
130: cover plate
140: circuit board assembly
141: first circuit board
141*a*: touch electrode layer
142: second circuit board
142*a*: coil set
142*a*1, 142*a*2: coil unit
142*a*11, 142*a*12, 142*a*21, 142*a*22: straight coil bundle section
142*b*: elastic arm
142*c*: through groove
143: supporting unit
150: adhesive layer
160, 260: magnet set
170: force sensor
180: connecting member
181: concavity
2-2: cutting plane line

What is claimed is:

1. A touch device, comprising:

a circuit board assembly, comprising:

a first circuit board having a touch electrode layer disposed thereon;

a second circuit board having a coil set disposed thereon; and a plurality of supporting units that physically contact and provide support between the first circuit board and the second circuit board;

a magnet set, disposed on the first circuit board and disposed corresponding to the coil set;

a casing located below the second circuit board;

a connecting member connected between the casing and the second circuit board, wherein the connecting member has a plurality of concavities; and a plurality of force sensors, wherein the second circuit board comprises a plurality of elastic arms, the plurality of force sensors are disposed on the plurality of elastic arms individually, and the plurality of concavities are disposed under and corresponding to the plurality of force sensors.

2. The touch device of claim 1, wherein the magnet set is disposed on a side of the first circuit board facing the second circuit board.

3. The touch device of claim 1, wherein the plurality of supporting units are disposed on the plurality of elastic arms individually.

4. The touch device of claim 3, wherein the second circuit board comprises a plurality of through grooves, and the plurality of through grooves are adjacent to edges of the plurality of elastic arms individually.

5. The touch device of claim 4, wherein the plurality of through grooves are U-shaped grooves.

6. The touch device of claim 1, wherein the plurality of force sensors are disposed on a side of the second circuit board facing the first circuit board.

7. The touch device of claim 1, wherein the connecting member has two sides that are opposite to each other, and the plurality of concavities are on at least one side of the two sides of the connecting member.

8. The touch device of claim 1, wherein the casing faces a surface of the connecting member and has a plurality of grooves.

9. A touch device, comprising:

a circuit board assembly, comprising:

a first circuit board having a touch electrode layer disposed thereon;

a second circuit board having a coil set disposed thereon; and a plurality of supporting units that provide support between the first circuit board and the second circuit board;

a magnet set, disposed on the first circuit board and disposed corresponding to the coil set;

a connecting member connected to the second circuit board, wherein the connecting member has a plurality of concavities; and a plurality of force sensors, wherein the second circuit board comprises a plurality of elastic arms, the plurality of force sensors are disposed on the plurality of elastic arms individually, and the plurality of concavities are disposed under and corresponding to the plurality of force sensors.

10. The touch device of claim 9, further comprising:

a casing located below the second circuit board, wherein the connecting member is connected between the casing and the second circuit board.

11. The touch device of claim 9, wherein the magnet set is disposed on a side of the first circuit board facing the second circuit board.

12. The touch device of claim 9, wherein the plurality of supporting units are disposed on the plurality of elastic arms individually.

13. The touch device of claim 9, wherein the second circuit board comprises a plurality of through grooves, and the plurality of through grooves are adjacent to edges of the plurality of elastic arms individually.

14. The touch device of claim 13, wherein the plurality of through grooves are U-shaped grooves.

* * * * *